United States Patent
Duval (10) Patent No.: US 9,881,734 B2
(45) Date of Patent: Jan. 30, 2018

(54) ELECTROMECHANICAL ACTUATION AND/OR GENERATION SYSTEM INCLUDING AN ELECTRICAL INSULATION BETWEEN THE ELECTRICAL SOURCE AND THE LOAD

(71) Applicant: HISPANO-SUIZA, Colombes (FR)

(72) Inventor: Cédric Duval, Samois sur Seine (FR)

(73) Assignee: LABINAL POWER SYSTEMS, Blagnac (FR)

( * ) Notice: Subject to any disclaimer, the term of this patent is extended or adjusted under 35 U.S.C. 154(b) by 330 days.

(21) Appl. No.: 14/435,959

(22) PCT Filed: Oct. 14, 2013

(86) PCT No.: PCT/FR2013/052440
§ 371 (c)(1),
(2) Date: Apr. 15, 2015

(87) PCT Pub. No.: WO2014/064363
PCT Pub. Date: May 1, 2014

(65) Prior Publication Data
US 2015/0270059 A1   Sep. 24, 2015

(30) Foreign Application Priority Data

Oct. 24, 2012 (FR) .................... 12 60139

(51) Int. Cl.
| | | |
|---|---|---|
| *H01F 38/18* | (2006.01) | |
| *B64C 11/44* | (2006.01) | |
| *H02K 7/18* | (2006.01) | |
| *H02K 11/00* | (2016.01) | |
| *F01D 7/00* | (2006.01) | |
| *H02J 5/00* | (2016.01) | |

(52) U.S. Cl.
CPC .............. *H01F 38/18* (2013.01); *B64C 11/44* (2013.01); *F01D 7/00* (2013.01); *H02J 5/005* (2013.01); *H02K 7/1823* (2013.01); *H02K 11/0094* (2013.01); *Y02T 50/66* (2013.01)

(58) Field of Classification Search
CPC ...................................................... H01F 38/18
USPC ........................................ 318/47, 46, 45, 34
See application file for complete search history.

(56) References Cited

U.S. PATENT DOCUMENTS

| | | | |
|---|---|---|---|
| 4,591,313 A | | 5/1986 | Miyatake et al. |
| 5,365,153 A | * | 11/1994 | Fujita .................... B06B 1/0261 318/34 |
| 5,418,446 A | * | 5/1995 | Hallidy .................. H02K 19/28 322/28 |

(Continued)

FOREIGN PATENT DOCUMENTS

| | | |
|---|---|---|
| FR | 2 961 176 A1 | 12/2011 |
| GB | 2 461 786 A | 1/2010 |
| WO | WO 2011/135236 A1 | 11/2011 |

OTHER PUBLICATIONS

International Search Report as issued in International Patent Application No. PCT/FR2013/052440, dated Jul. 25, 2014.

*Primary Examiner* — David S Luo
(74) *Attorney, Agent, or Firm* — Pillsbury Winthrop Shaw Pittman LLP (57) ABSTRACT

An actuator or generator device includes an AC rotary electric machine having an electrical connection for transferring electrical energy to the terminals of the stator of the machine, the device including a transformer.

12 Claims, 5 Drawing Sheets

(56) References Cited

U.S. PATENT DOCUMENTS 7,576,508 B2 * 8/2009 Xu .................. H02K 19/36
                                                       318/541

* cited by examiner

FIG.11

ELECTROMECHANICAL ACTUATION AND/OR GENERATION SYSTEM INCLUDING AN ELECTRICAL INSULATION BETWEEN THE ELECTRICAL SOURCE AND THE LOAD

CROSS REFERENCE TO RELATED APPLICATIONS

This application is the U.S. National Stage of PCT/FR2013/052440 filed Oct. 14, 2013, which in turn claims priority to French Application No. 1260139, filed Oct. 24, 2012. The contents of both applications are incorporated herein by reference in their entirety.

TECHNICAL FIELD AND PRIOR ART

The invention lies in the field of alternating current (AC) rotary electric machines. Such machines comprise in particular asynchronous motors or induction machines, and also synchronous motors or generators. Such electric machines deliver or are powered by a voltage that may be single-phase or three-phase, or more rarely two-phase. In motor or generator operation, there are operating points that are characterized by a torque and a speed of rotation that are reached by applying electrical energy.

Since power electronics has become available, controller converters can be used that enable an electric machine to be controlled over its entire torque/speed utilization range.

When the motor and/or generator and the controller converter are moving relative to each other, it is known to make use of moving contacts, typically rotary contacts, such as slip-ring assemblies. This applies for example in a jet engine, e.g. an unducted propfan in which the pitch of the blades needs to be controlled dynamically: the electric motor for pivoting the blades is itself in rotation about the axis of the engine and is controlled by an external controller converter that makes it possible in the electric machine to perform braking by converting mechanical energy into electrical energy and to perform actuation by converting electrical energy into mechanical energy. The connection is provided via a slip-ring assembly.

With an electric machine that is rotating relative to its controller converter, difficulties are encountered in terms of cooling contacts and in terms of the need to maintain them. Rotating contacts have a limited lifetime, to such an extent that electrical actuation has not supplanted hydraulically actuated rotary systems based on rotary joints, which themselves present other weaknesses, in particular risks of leakage. The controller converter is sometimes even installed in the moving reference frame in order to avoid the need to transmit power control between the stationary reference frame and the moving reference frame, but that leads to other difficulties, such as accelerated aging of the electronics located in constraining conditions, including vibration, centrifugal force, and potential high temperatures, and also difficulties relating to transferring control signals.

SUMMARY OF THE INVENTION

In order to solve these problems, the invention provides an actuator or generator device comprising an AC rotary electric machine having an electrical connection for transferring electrical energy to the terminals of the stator of the machine, the device being characterized in that the connection comprises a transformer. This thus serves to isolate the electrical machine electrically from an AC electricity source or load depending on whether it is operating in motor mode or generator mode. The transformer can be used for additional shaping of the electrical energy by virtue of its current or voltage transformation ratio and it can thus enable the power converter to be simplified or it can enable it to be adapted to the motor, and vice versa.

The invention may be implemented in an on-board electricity network, e.g. an airplane electricity network. It is thus possible to power the electric starter motor of the auxiliary power unit (APU) turbine in order to start it by using a transformer based on the principles described in this document. It is also possible to power the electric starter motor of the main turbine of a turbojet, for starting purposes, on the same principles.

By means of the invention, the electric machine is electrically isolated from the source or from its electrical load by magnetic coupling.

The machine may be an asynchronous machine or it may be a synchronous machine including a damper circuit or damper bars, in which case, in spite of the constraints involved in servo-controlling torque at zero speed, it is possible to do this through a transformer.

Advantageously, the transformer may be a transformer having a particular transformation ratio suitable for optimizing the controller converter and/or the motor.

Advantageously, the transformer may be a rotary transformer, in which case it can replace moving contacts of the kind to be found in slip-ring assemblies or it can replace hydraulic rotary actuator systems based on rotary joints.

The transformer makes it possible to avoid placing the controller converter in a rotating zone, which may also be a high temperature zone, while also avoiding any need to provide specific cooling, and while enabling the target system to be actuated during rotation or when stationary. The transformer and the electric motor may be spaced apart from each other.

The device may include a control unit configured to perform vector control and/or servo-control. It is thus possible for motor-control commands to vary greatly without saturating the transformer, providing certain criteria are satisfied concerning those commands, and in particular minimizing the ratio V/f of voltage divided by frequency.

In an embodiment, the device has at least one second AC electric machine with an electrical connection for enabling it to be powered electrically by a source applying a voltage to the terminals of the stator, the connection of the second motor including the transformer, and the device further including two mechanical connections for actuating two different target systems, each via a respective one of the two motors.

In yet another embodiment, the device has at least one second AC electric machine, with an electrical connection enabling it to be electrically powered by a source by applying a voltage to the terminals of the stator, the device also having two mechanical connections, each for actuation by a respective one of the two motors, and a synchronization linkage for synchronizing the two mechanical connections.

In yet another embodiment, the actuator or generator device also includes a second transformer for transferring electrical energy to the terminals of the rotor. This makes it possible to vary the power supply to the machine, e.g. depending on whether it is starting or whether it is rotating under steady conditions.

It is also possible for the device to include a configuration unit for modifying the voltage or current ratio between the primary and the secondary of the transformer.

The invention may be applied to a propulsion engine having variable pitch blades, and including an actuator device as mentioned above, the actuator device being arranged to actuate at least one blade of the engine, and wherein the transformer is a rotary transformer transferring electrical power from a zone of the electrical machine that, in operation of the engine, is not rotating to a zone that is rotating. In generator operation of the electrical machine, the rotary transformer serves either to transfer electrical power from a rotating zone to a non-rotating zone or to control the dissipation of electrical energy as thermal energy in the electric machine. The engine may be a jet engine having an unducted fan.

The invention also provides an on-board electricity network including an actuator or generator device as described above.

BRIEF DESCRIPTION OF THE FIGURES

The invention is described below with reference to the accompanying figures that are given by way of illustration.

DETAILED DESCRIPTION OF THE INVENTION

Figure 1:
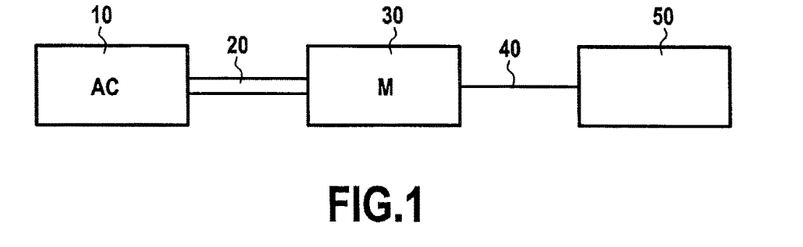
FIG. 1 shows a motor that is powered and controlled in accordance with the prior art.

FIG. 1 shows a prior art actuator device, and more generally an energy converter device, comprising an AC motor 30 having an electrical connection 20 for applying and taking AC power from a source 10 and applying it to the stator of the device. The electrical connection 20 comprises at least two conductor cables, with the number of cables being a function of the type of AC power used, which may be single-phase, three-phase, or six-phase, in particular. With three-phase power, the stator may be connected to the electrical connection in a star connection or a delta connection. The motor has a mechanical connection 40 connected to its rotor for actuating a target system 50.

The source 10 generally comprises a controller converter, and its last component prior to the electrical connection 20 serves to control a voltage or a current at a frequency defined by control electronics.

In addition to the conductor cables, the electrical connection 20 may also have a set of rotary pick-ups of the brush type coupled to slip rings or friction rings.

The motor 30 may be a motor that is asynchronous, synchronous, direct current (DC), or piezoelectric. For an asynchronous machine, the motor may be controlled using a scalar control at constant V/f ratio (voltage divided by frequency), or when the frequency is low, as constant E/f ratio (electromotive force (emf) divided by frequency).

Figure 2:
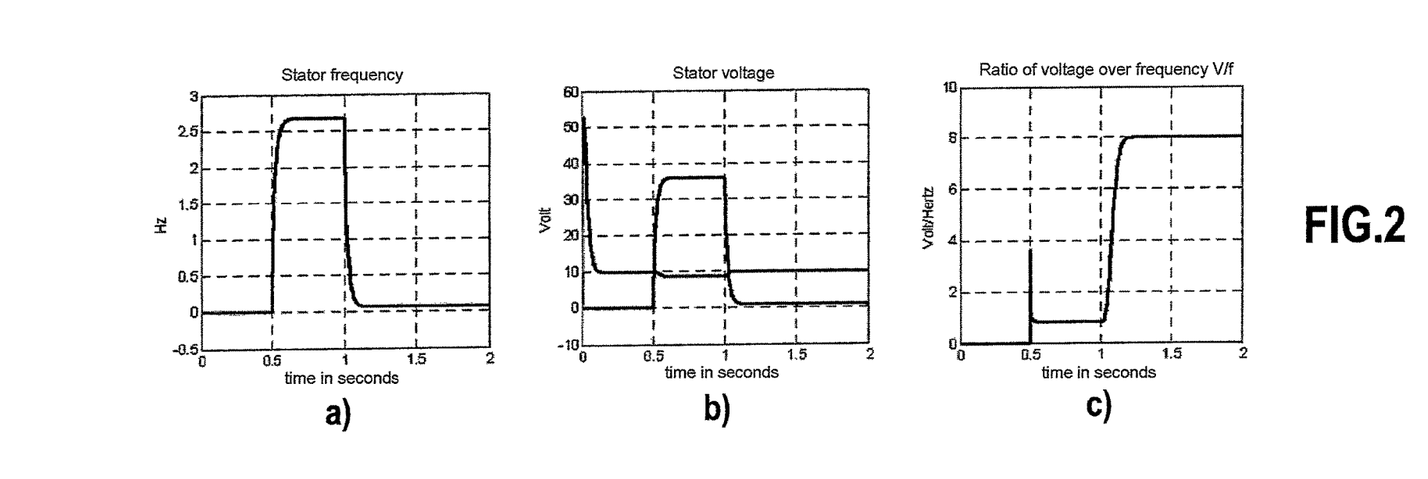
FIG. 2 shows an example of vector control applied to the FIG. 1 motor, in accordance with the prior art.

For an asynchronous machine, FIG. 2 shows an example of vector control as applied in the prior art by the source 10 to the motor 30 with its rotor blocked. The graph of FIG. 2a shows the frequency of the applied voltage, the graph of FIG. 2b shows the components of the applied voltage, and the graph of FIG. 2c shows the ratio of these two values. The sequence shown has three successive stages: firstly a DC fluxing stage beginning for one voltage component at 50 volts (V) and stabilizing at 10 V (the other component is zero), followed by a stage at higher voltage with a component at 35 V, alternating at 2.7 hertz (Hz) for a V/f ratio close to 1 (ignoring a multiplying factor), and finally a stage at lower voltages and frequencies, with a V/f ratio of 8.

Figure 3:
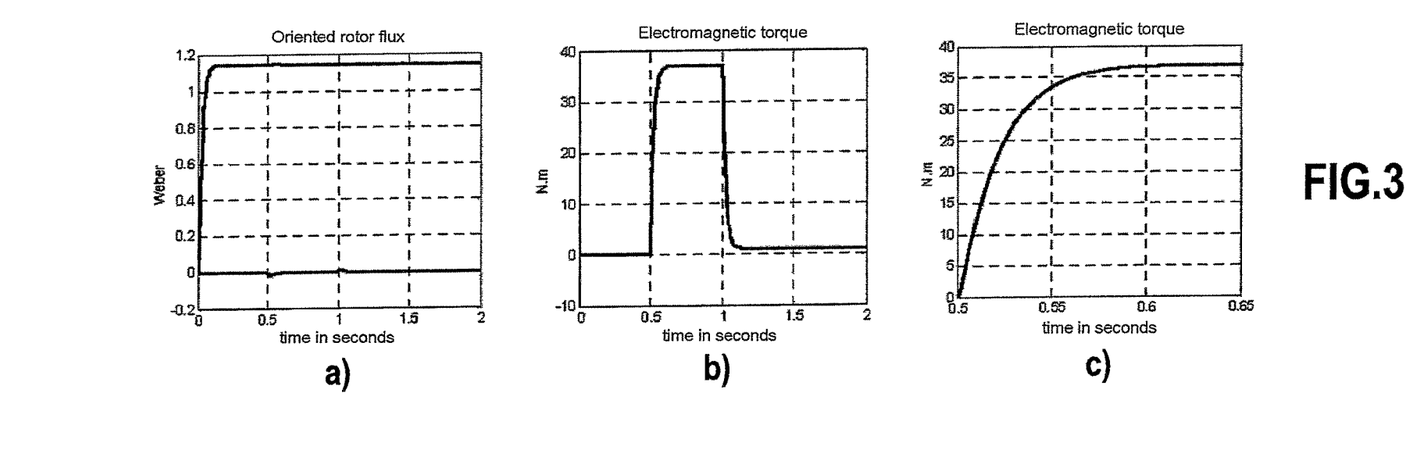
FIG. 3 shows the effect of the FIG. 2 vector control on the rotor of the FIG. 1 motor.

FIG. 3 shows the effects of this control on the rotor. The graph of FIG. 3a shows the flux components to which the rotor is subjected, and the graph of FIG. 3b shows the torque that originates in the rotor. The graph of FIG. 3c is an enlargement of a portion of the graph of FIG. 3b.

During the application of the fluxing stage, the rotor of the motor 30 is subjected to an oriented flux of a magnitude that starts from 0 webers (Wb) and rapidly becomes established at 1.1 Wb (for one of the components, the other being zero). Thereafter the flux remains constant until the end of the third stage. The torque is zero during the first stage, rises to 37 newton meters (Nm) during the second stage and is weak during the third stage, being at 1 Nm to 2 Nm. The graph of FIG. 3c shows that torque is established in 0.1 seconds (s) from the beginning of the second stage.

In FIG. 2c, it can be seen that it is difficult to create low torque while maintaining V/f at a value of constant order of magnitude.

Figure 4:
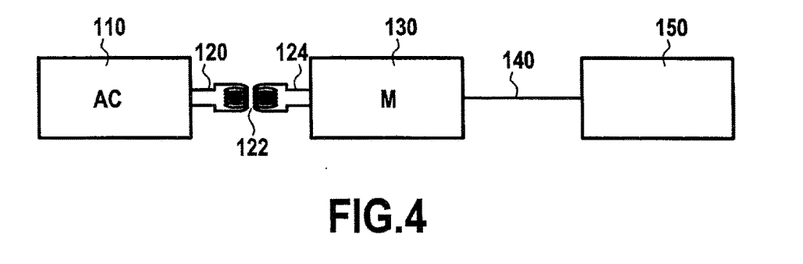
FIG. 4 shows a motor that is powered and controlled in accordance with the invention.

FIG. 4 shows an actuator device, or more generally an energy converter device, of the invention. It comprises elements analogous to those shown in FIG. 1, with references increased by 100. Thus, the device comprises an AC motor 130 having an electrical connection for applying AC electrical power to the terminals of its stator, which power is delivered by a source 110. The electrical connection has a section 120 made up of at least two conductor cables, with the number of cables depending on the type of AC power used, and a section 124 likewise made up of a number of parallel cables, which number is a function of the type of electric machine used. The two sections are connected together by an isolating transformer 122, the section 120 being connected to the primary of the transformer 122, and the section 124 being connected to the secondary of the transformer 122. The primary and the secondary of the transformer 122 are electrically isolated from each other. With a three-phase power supply, the stator may be connected to the section 124 in a star connection or a delta connection. The motor has a mechanical connection 140 connected to its rotor for actuating a target system 150.

As above, the source 110 generally, but not always, comprises a controller converter with a final element prior to the electrical connection 120 that is constituted by a converter producing an AC voltage at a frequency defined by control electronics. The conductor cables of the electrical connection 120 are connected to output nodes of the converter between diodes, transistors, and passive filters, which create the AC voltage on being actuated.

In addition to the conductor cables, the sections 120 and 124 may include a set of rotary pick-ups of the type comprising brushes coupled to friction rings or slip rings in order to acquire measurement signals. Importantly, there are no power electronics between the transformer 122 and the motor 130, i.e. in the section 124. The waveform of the voltage and its frequency remain unchanged all along this section, unlike its amplitude which may vary (transformation ratio of the transformer, voltage drop, . . . ).

Figure 5:
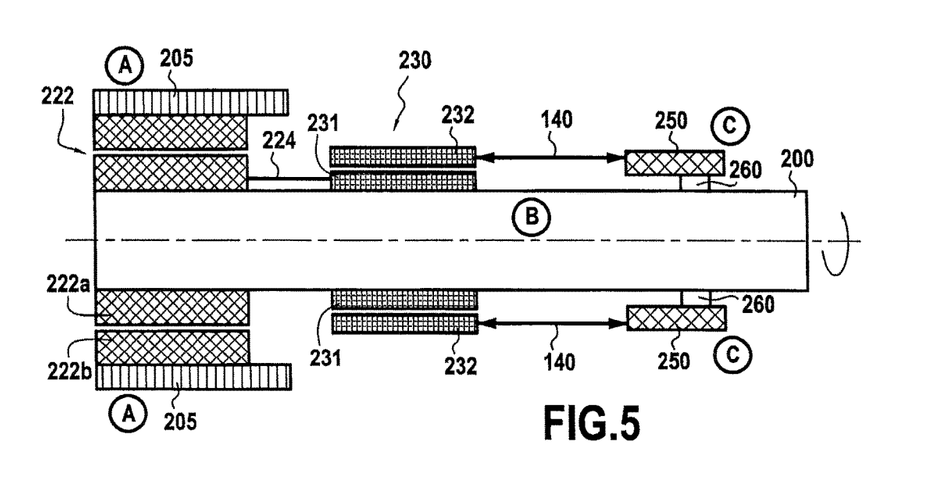
FIG. 5 shows an embodiment of the invention.

FIG. 5 shows an embodiment of the invention, e.g. suitable for the structure of an unducted propfan. The motor 230 comprises a stator 231 and a rotor 232 that acts via one or more linkages 140, possibly including one or more sets of gears, to actuate a single target system 250, in this example a system for dynamically varying the pitch of fan blades. The stator 231 is stationary in a reference frame B that rotates relative to the body of the airplane or the nacelle 205 of the engine, which constitutes a stationary reference frame A, e.g. the reference frame B is connected to a rotary shaft 200 of the engine. The target system 250 constitutes a reference frame C that moves in rotation relative to the reference frame B (or the rotary shaft) via a rotary linkage 260.

The motor 230, which may be an asynchronous machine, is AC powered by parallel electric cables 224 connected directly to the secondary 222a of a rotary transformer 222, having its primary 222b stationary in the reference frame A, e.g. mounted stationary on the nacelle 205 of the engine.

In the embodiment of FIGS. 4 and 5, in a variant that constitutes an improvement, the transformer 122 or 222 may be provided with an outer ring of thickness that is overdimensioned relative to its arms, serving to avoid saturation of the ferromagnetic material in the event of command being applied at a speed that is low or zero. With a conventional design, the area of the airgap in a rotary transformer is often increased from the outset in order to limit the magnetizing current.

This is done particularly, but not only, for the purpose of controlling the motor 130 or 230, which is an asynchronous machine.

Thus, by increasing the weight of the transformer 122 or 222 by as little as about 10%, due to such overdimensioning of the ring, the transformer can accept a ratio V/f that is three times greater than that needed for controlling the motor at high frequency, and can do this without its core becoming saturated when a command is applied at low speed. There is no need to increase the weight of the arms of the transformer.

Figure 6:
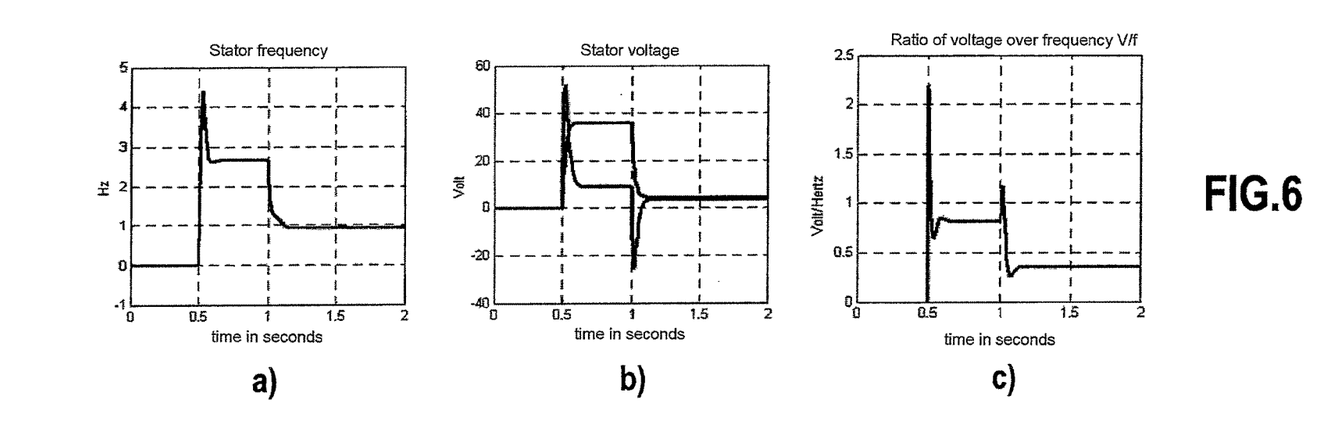
FIG. 6 shows an example of vector control applied to the FIG. 4 motor in accordance with the invention.

FIG. 6 shows vector control applied to an asynchronous motor powered in the manner shown in FIGS. 4 and 5, and based on a control strategy that is compatible with that configuration, whereby the flux is servo-controlled in part as a function of a torque setpoint.

The graph of FIG. 6a shows the frequency of the applied voltage, the graph of FIG. 6b shows the components of the applied voltage, and the graph of FIG. 6c shows the ratio between these two values. The sequence shown has three successive stages: firstly a stage at zero voltage; then a stage with an applied voltage having a component that rises quickly to 35 V and a component that begins at a high value and quickly stabilizes at 10 V, alternating at about 2.7 Hz, for a ratio V/f close to 0.7 (ignoring a multiplication factor); and then finally a stage at lower voltages and frequencies, with a ratio V/f close to 0.4.

Figure 7:
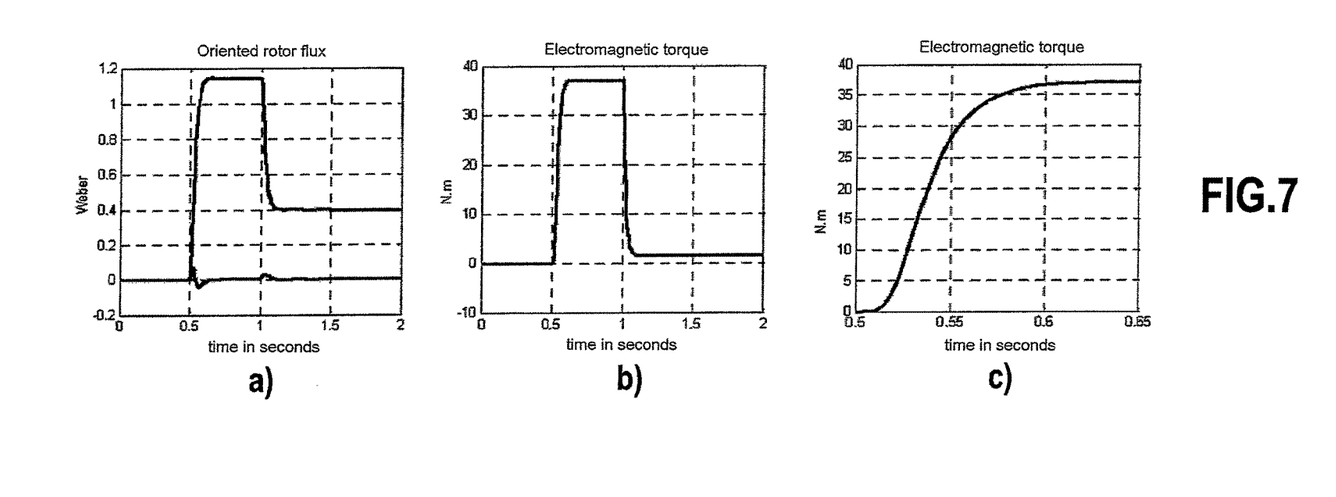
FIG. 7 shows the effect of the vector control of FIG. 6 on the rotor of the motor of FIG. 4 or FIG. 5.

FIG. 7 shows the effects of this command on the rotor. The graph of FIG. 7a shows the flux component to which the rotor is subjected, and the graph of FIG. 7b shows the torque generated in the rotor. The graph of FIG. 7c constitutes an enlargement of a portion of the graph of FIG. 7b.

While this command is being applied, the rotor of the motor 130 is subjected to zero flux during the first stage, with flux then increasing rapidly to more than 1 Wb (for one of the components, the other being zero) during the second stage, and decreasing quickly to 0.4 Wb, after which it remains constant until the end of the third stage (the other component remaining zero). The torque is zero during the first stage, high at about 37 Nm during the second stage, and low at about 1 Nm or 2 Nm during the third stage. The graph of FIG. 7c shows that torque is established at 0.1 s from the beginning of the second stage, only very little slower than in the corresponding stage of the control shown in FIG. 3.

FIG. 6b shows that, with the proposed strategy, it is possible to control a low torque, while conserving a ratio V/f having an order of magnitude that is less than or equal to the ratio V/f corresponding to nominal operation of the electric machine.

Figure 8:
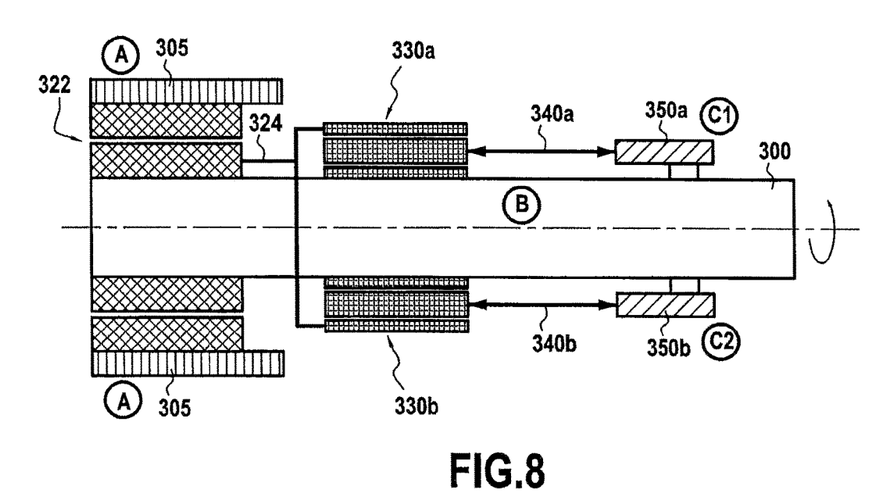
FIG. 8 shows a variant embodiment of the invention.

FIG. 8 shows a second embodiment comprising two asynchronous motors 330a and 330b, two target systems 350a and 350b, and a transformer 322, e.g. a rotary transformer. In this embodiment, the two motors are powered directly with the same voltage and the same frequency, and it is ensured beforehand that the opposing torques from the target systems are always less maximum possible torques, during the transient conditions preceding steady conditions, in the light of the characteristics of the corresponding motors. Linkages 340a and 340b are present between the rotors of the motors and the corresponding target systems. Electric cables with branch connections power both the stator of the motor 330a and the stator of the motor 330b, but no power electronics is present between the transformer 322 and the stator of the motor 330a, nor between the transformer 322 and the stator of the motor 330b.

Figure 9:
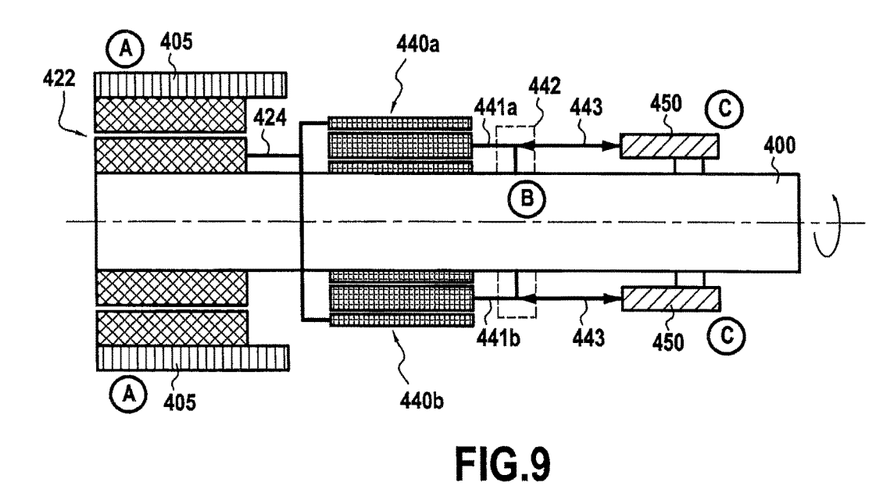
FIG. 9 shows another variant embodiment of the invention.

FIG. 9 shows a variant of the FIG. 8 embodiment in which corresponding elements are given references plus 100, and in which the two motors 440a and 440b actuate only one target system or a plurality of synchronized target systems 450. A synchronization linkage 442 is present between firstly the output linkages 441a and 441b, each corresponding to the rotor of one of the motors, and secondly a synchronized linkage 443 actuating the target system 450. The synchronization linkage may be associated with the outlet from the motor, with stepdown gearing, or with the target system.

Figure 10:
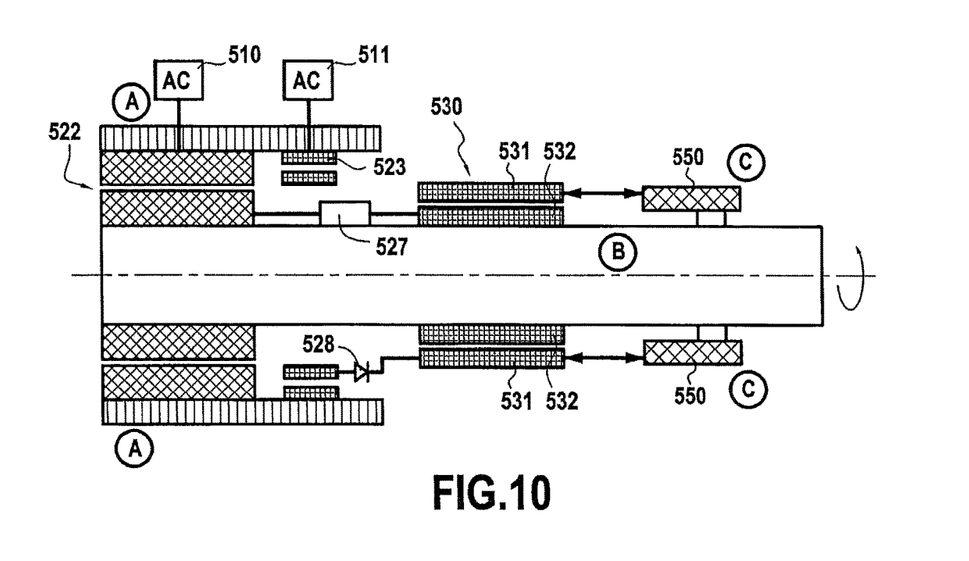
FIGS. 10 and 11 show two other embodiments of the invention.

FIG. 10 shows an embodiment of the invention involving a synchronous electric machine 530 operating in motor or generator mode with a starter field winding 531 having damper bars that are dimensioned, or a damper winding that is dimensioned, to make asynchronous starting possible (also referred to as induction starting). This makes it possible to obtain torque in the target system 550, which is connected to the starter field winding, even if the synchronous motor 530 is not rotating.

The synchronous machine 530 is arranged with its armature 532 in the reference frame B and its starter field winding 531 in the reference frame C. There may be a linkage and/or stepdown gearing between the target system 550 and the starter field winding 531.

A starting command is transmitted to the armature 532 of the machine 530 by an AC source 510 through the rotary transformer 522. This constitutes an interface between the reference frames A and B, the source 510 being in the reference frame A.

Once the electric machine 530 and the target system 550 are rotating, a second rotary transformer 523 powered by an AC source 511 serves to power the starter field winding 531 with DC (via a passive rotary rectifier 528 present on the connection between the transformer 523 and the starter field winding 531) and then allows it to change to a synchronous mode of operation.

The rotary transformer 522 for powering the armature 532 is itself powered by the AC source 510, and is of higher power than the rotary transformer 523 for powering the starter field winding 531, which is itself powered by the AC source 511.

If necessary, it is possible to add a switch 527 (contactor, relay, circuit breaker, isolating switch, . . . ) that does not have any function in servo-controlling the motor, the switch being arranged between the transformer 522 and the armature 532. Servo-control takes place solely in the reference frame A of the electricity sources, as above.

This embodiment with a second transformer for the starter field winding also applies to the other embodiments described above.

In all of the embodiments described, the architecture is reversible in terms of power, in other words it is possible in the reference frame A to recover electrical energy produced in the reference frame B. This mode of operation of generator type as opposed to motor type also makes it possible to brake the target system (250, or 350a, 350b, 450, or 550, as the case may be).

Another way of obtaining this braking function to some extent may be to dissipate mechanical energy as heat energy in the rotor of the electric machine, if it is of the asynchronous type, or in the damper bars when the synchronous machine has damper bars.

Figure 11:
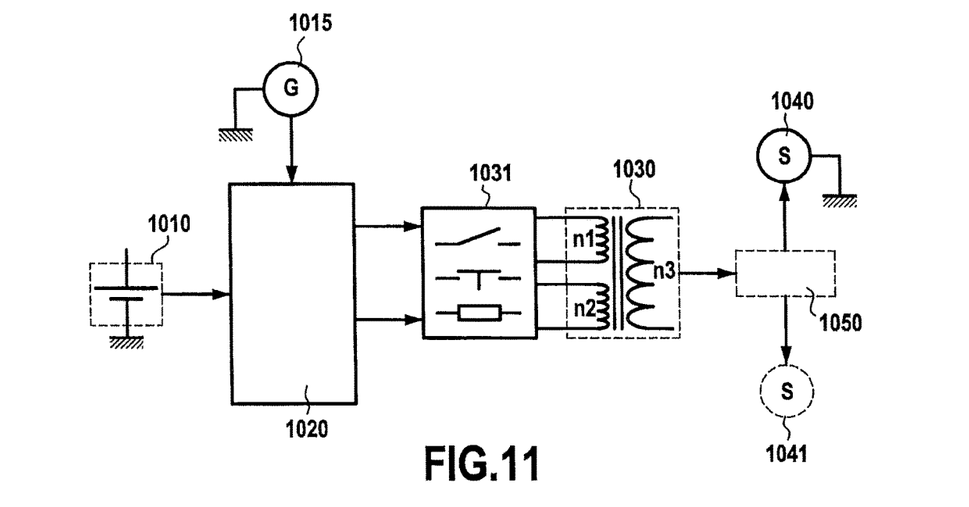

FIG. 11 shows an example of using the servo-control principle of the invention in an on-board electricity network.

A first possibility is to use a DC voltage source 1010 that acts through a DC/AC power converter 1020 to power the primary of a transformer 1030 producing an AC voltage in its secondary for servo-controlling an electric machine 1040 with asynchronous starting.

In reversible manner, the electric machine 1040 may become a generator, thereby powering the DC voltage source 1010.

The advantage of this configuration is to be able to use the transformer 1030 to modify the voltage ratio (n3/n1) or the current ratio (n1/n3) by using a configuration unit 1031, thereby avoiding the use of a boost or buck type DC/AC converter, which would have passive elements that might be heavy, bulky, and not very reliable.

Furthermore, if the electric machine 1040 is of the starter generator type, in order to enable it to operate as a generator for the electricity network, its neutral is conventionally connected to the ground of the on-board electrical network in order to make it safe.

On starting, direct use of a starter-converter at the terminals of the electric machine makes it necessary to segregate the neutral of the DC source or the neutral of the electric machine from the ground of the electricity network. Without electrical isolation, current would appear between the two neutrals via the ground of the electricity network.

With the invention, the electrical isolation is provided by the transformer 1030.

An additional embodiment may involve using a generator as an AC source 1015. An AC/AC power converter is then used instead of the DC/AC converter 1020. In order to optimize the AC/AC converter it may be made up of a simple AC/DC converter (e.g. a passive rectifier) together with the above-described DC/AC converter (e.g. a three-phase inverter having an H bridge or a half-bridge) that is appropriately dimensioned in order to ensure compatibility.

If the first transformation ratio of the transformer is not appropriate, it is possible to use another primary circuit on the same magnetic circuit of the transformer or even to associate a second circuit in series so as to obtain the appropriate transformation ratio n3/n2 or n3/(n2+n1). As above, electrical isolation makes it possible to avoid having to segregate neutral and ground.

The configuration unit 1050 also makes it possible to interchange various electric machines 1040 and 1041 or merely to segregate the electric machine 1040 so as to enable it to operate as a generator and power the electricity network.

The following advantages are obtained with this family of configurations involving a stationary transformer: the electric machine is electrically isolated from the voltage source, and it is possible to modify the transformation ratio, which may serve to adapt voltage.

Various embodiments are described above making it possible either to servo-control and regulate one or more motors via a transformer, or else to actuate without control one or more motors via a transformer. There is no active actuator between the transformer and the motor. There need not be any power electronics or control electronics in the rotary zone. It is specified that the type of transformer (single-phase, three-phase, . . . ) may be a function of the type of motor used (single-phase, three-phase, . . . ), and of the presence, if any, of a device for starting the motor. As mentioned above, the electric machine may operate in generator mode, depending on circumstances. There may be a plurality of transformers in series to pass energy between the source and the energy consumer. There may also be a plurality of rotary electric machines (two or more) that are powered by or that power an energy consumer via the transformer or the transformers.

The invention is not limited to the embodiments described, but extends to any variant coming within the ambit of the claims.

The invention claimed is:

1. A device comprising an AC rotary electric asynchronous machine having an electrical connection for applying an AC voltage created at an output of a stationary controller converter to terminals of a stator of the asynchronous machine, wherein the connection comprises a rotary transformer, the stationary controller converter being configured to servo-control the asynchronous machine via the rotary transformer without having recourse to an actuator between the rotary transformer and the asynchronous machine.

2. The device according to claim 1, wherein the asynchronous machine is servo-controlled in vector and/or scalar controlled.

3. The device according to claim 1, further including at least one second AC rotary electric asynchronous machine having an electrical connection for applying an AC voltage to the terminals of the stator of the second asynchronous machine, the connection of the second asynchronous machine including a rotary transformer, the device further including two mechanical connections for actuating two different target systems, each via a rotor of a respective one of the two asynchronous machines.

4. The device according to claim 3, wherein the mechanical connection includes one or more stepdown gears.

5. The device according to claim 1, further including at least one second AC rotary electric asynchronous machine having an electrical connection for applying an AC voltage to terminals of the stator of the second asynchronous machine, the connection of the second asynchronous machine including the rotary transformer, the device also including two mechanical connections, each for actuating a single target system via the rotors of a respective one of the two asynchronous machines, and a synchronization linkage for synchronizing the two mechanical connections.

6. The device according to claim 5, wherein the mechanical connection includes one or more stepdown gears.

7. The device according to claim 1, wherein the rotary transformer has a determined transformation ratio enabling the controlled converter and/or the asynchronous machine to be optimized.

8. A propulsion engine having variable pitch blades, the engine including a device according to claim 1, the device being arranged to actuate at least one blade of the engine, said rotary transformer transferring electrical power from a non-rotary zone of the engine to a rotary zone of the engine.

9. An unducted propfan comprising a propulsion engine according to claim 8.

10. The device according to claim 1, wherein a secondary of the rotary transformer is directly connected to said stator of the asynchronous machine.

11. A device comprising an AC rotary electric machine having an electrical connection for applying an AC voltage created at an output of a stationary controller converter to terminals of a stator of the machine, wherein the connection comprises a rotary transformer, the stationary controller converter being configured to servo-control the machine via the rotary transformer without having recourse to an actuator between the rotary transformer and the machine, wherein the machine is a synchronous machine having a starter field winding that includes damper bars or a damper circuit.

12. The device according to claim 11, further including a second rotary transformer for powering the starter field winding with DC via a passive rotating rectifier.

* * * * *